United States Patent
Liguori

(10) Patent No.: US 6,307,968 B1
(45) Date of Patent: Oct. 23, 2001

(54) DIRECT MANIPULATION OF COMPRESSED GEOMETRY

(76) Inventor: Vincenzo Arturo Luca Liguori, 13 Oatway Parade, North Manly, New South Wales, 2100 (AU)

( * ) Notice: Subject to any disclaimer, the term of this patent is extended or adjusted under 35 U.S.C. 154(b) by 0 days.

(21) Appl. No.: 09/211,029

(22) Filed: Dec. 14, 1998

(30) Foreign Application Priority Data

Dec. 15, 1997 (AU) .................................................... PP0911

(51) Int. Cl.[7] .................................................. G06K 9/36
(52) U.S. Cl. ............................................................ 382/235
(58) Field of Search .................................. 382/232, 239, 382/240, 241, 242, 233, 250

(56) References Cited

U.S. PATENT DOCUMENTS

| | | | |
|---|---|---|---|
| 5,546,477 | * 8/1996 | Knowles et al. | 382/242 |
| 5,592,228 | * 1/1997 | Dachiku et al. | 382/241 |
| 5,598,215 | * 1/1997 | Watanabe | 382/242 |
| 5,647,024 | * 7/1997 | Kawauchi et al. | 382/242 |
| 5,666,212 | * 9/1997 | Gilge | 382/242 |

* cited by examiner

Primary Examiner—Jose L. Couso
(74) Attorney, Agent, or Firm—Davis & Bujold, P.L.L.C.

(57) ABSTRACT

A method of spatial manipulation of geometry data describing a graphical object to produce manipulated geometry data, the method comprising the steps of: (a) compressing the geometry data of into a compressed form, the compressing including the step of transforming the data into corresponding frequency domain component data; (b) applying at least one linear transform to the compressed form of the geometry data; (c) decompressing the geometry data, including applying an inverse transform to the frequency domain component data to transform it to produce the manipulated geometry data. The linear transforms can include one of: translation of the geometry data; scaling of the geometry data; affine transformation of the geometry data; morphing of the geometry data; applying a dot product to the geometry data.

12 Claims, 13 Drawing Sheets

| ZLENGTH | Zv | Yv | Xv | CODE | Xd | Yd | Zd |

111 — Number of sequential null triplets

112 — CODE

113 — Values of the X, Y and Z coefficients

Fig. 11

DIRECT MANIPULATION OF COMPRESSED GEOMETRY

FIELD OF THE INVENTION

The present invention relates to the manipulation of compressed data.

BACKGROUND OF THE INVENTION

Modern 3D computer graphic applications require the manipulation, storage and transmission of increasingly complex geometries. Efficient manipulation of such data is critical for the implementation of high performance graphic systems.

Traditionally, complex geometries have been represented as polygonal meshes and parametric surfaces patches such as NURBS. While polygonal meshes are simple to process, they don't constitute a particularly compact representation for a complex, natural surface. Indeed, representing complicated objects might require a large number of polygons. Parametric surfaces obviate most of these disadvantages, but are much harder to render.

Accordingly, many schemes for compact representation of complex geometries have been presented by various authors. An example can be found in Deering M., "Geometry Compression", Computer Graphics (proc. SIGGRAPH), pages 13–20, August 1995 where a method for compressing geometries and associated information (such as normals and colours) is presented. Deering is directed to real time rendering. Methods to efficiently convert existing models in the format described in Deering can be found in Chow M., "Optimized Geometry Compression for Real-time Rendering" (proc. IEEE Visualization '97), 1997.

A different approach is taken in DeRose T. "Multiresolution Surfaces for Compression, Display, and Editing", SIGGRAPH '96 Course Notes, Course Number 13, Wavelets in Computer Graphics, where a multiresolution representation of geometric data is described along with its advantages for compression.

Other approaches, such Hoppe H., "Progressive meshes", Computer Graphics (proc. SIGGRAPH '96), pages 99–108, 1996 and Hoppe H., Popovic J.; "Progressive Simplicial Complexes", (http://research.microsoft.com/~hoppe) 1997 are based on mesh simplification and allow access to the geometric data at different levels of detail. Of course, in all these cases, there is a decompression overhead on the top of the rendering process.

SUMMARY OF THE INVENTION

It is an object of the present invention to provide an alternative form of manipulation of compressed data.

In accordance with a first aspect of the present invention, there is provided a method of spatial manipulation of geometry data describing a graphical object to produce manipulated geometry data, the method comprising the steps of: (a) compressing the geometry data of into a compressed form, the compressing including the step of transforming the data into corresponding frequency domain component data; (b) applying at least one linear transform to the compressed form of the geometry data; (c) decompressing the geometry data, including applying an inverse transform to the frequency domain component data to transform it to produce the manipulated geometry data.

The linear transforms can include for example, one of: translation of the geometry data; scaling of the geometry data; affine transformation of the geometry data; morphing of the geometry data; and applying a dot product to the geometry data.

The step (a) further can comprise: quantizing the frequency component domain data and zeroing the frequency component domain data less then a predetermined magnitude.

The step of transforming the data into corresponding frequency component domain can ideally comprise utilizing a Discrete Cosine, Fourier, Hardamard or Wavelet transform.

The geometry data preferably can include a series of vertex points and color data and/or normal data associated with each of the vertex points.

The dimensionality of the geometry data can be arbitrarily defined.

In accordance with a further aspect of the present invention, there is provided a method of manipulation of geometric data comprising a series of vertex points defining a geometric structure, the method comprising the steps of: transforming the data into a frequency domain to produce corresponding frequency domain data; applying a linear transform to the frequency domain data to produce linearly transformed frequency domain data; inverse transforming the linearly transformed frequency domain data to produce manipulated geometric data.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 11 illustrates a specialized runlength encoding structure utilized in an implementation of the present invention;

DESCRIPTION OF PREFERRED AND OTHER EMBODIMENTS

The preferred embodiment is directed to performing commonly required geometry manipulation operations (such as affine transformations, dot products, scaling, etc.) directly on compressed data. The rationale behind this is that such operations will be performed on an amount of data hopefully much smaller than the final decompressed geometry data. Since such operations are needed anyway in the course of the rendering process and are normally performed after decompression, the outcome will be an overall reduction of the total decompression and rendering time.

Figure 1:
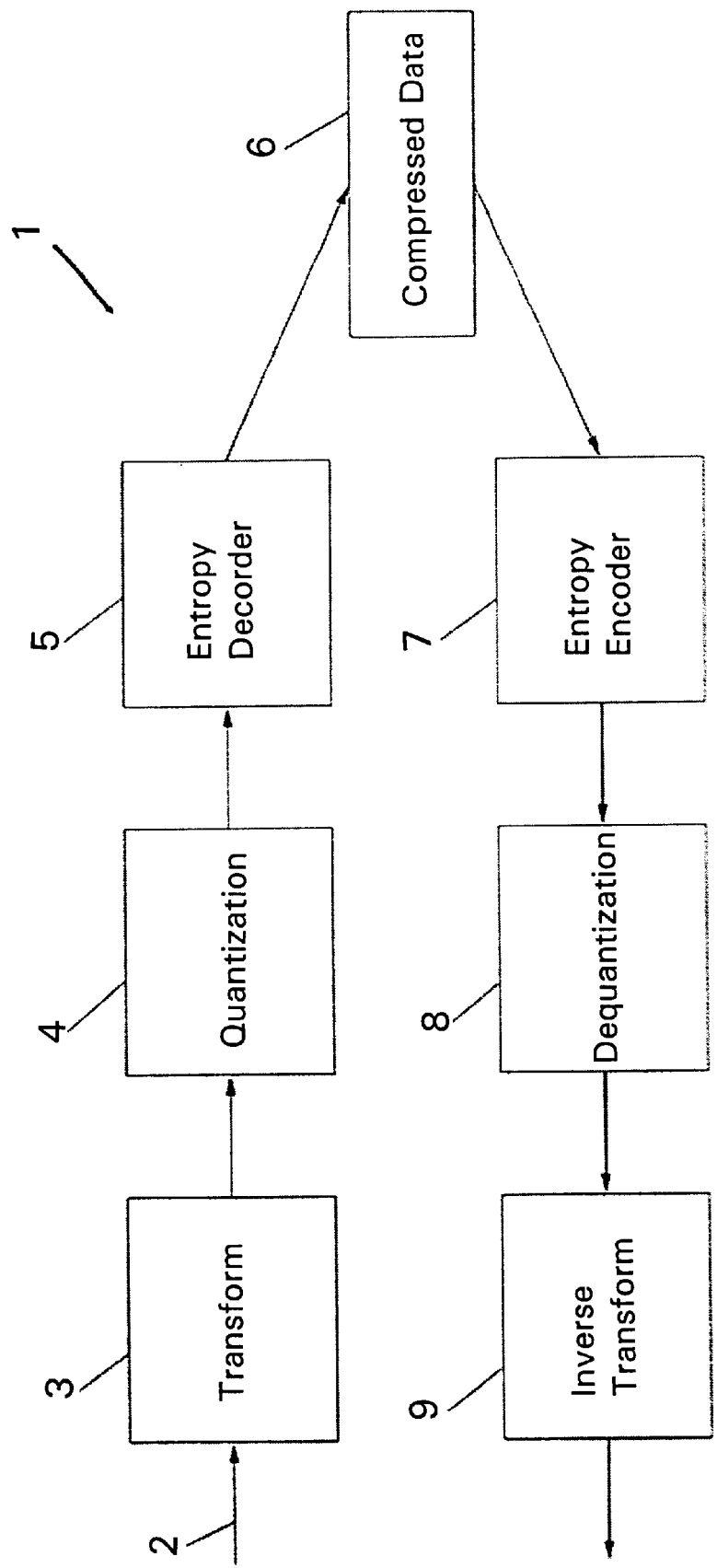
FIG. 1 illustrates a standard compression and decompression process.

A powerful and general method to compress a variety of data sets and signals, well known to researchers in the field, is through a linear transform. FIG. 1 illustrates 1 the steps to compress and decompress a given input signal 2. Without loss of generality and for illustration purposes only, it is assumed that such signal 2 can take the form of a function of one variable f(t). A linear transform T is then applied to such a signal 2 in transform stage 3 as follows:

$$F(u)=T(f(t))$$

A great variety of transforms such as Discrete Cosine, Fourier, Hadamard and Wavelet transforms, to mention a few, have been successfully utilized in the art. Many linear transforms have the property of compacting the energy of the original signal in a few coefficients of the transformed signal, while the other coefficients can be orders of magnitude smaller. The entropy of the original signal can also be reduced.

The transformed signal is then passed through a quantization stage 4 in order to further reduce its entropy. The degree of quantization will depend on the amount of compression required and the distortion that can be tolerated in the chosen application. The quantization process 4 will, in general, result in a transformed and approximated signal with many of its coefficients set to zero. Many other methods other than quantization are well known to produce an approximation of the transformed signal. The resulting data is passed to an entropy encoder stage 5 before being stored 6 or otherwise utilized. The decompression process reverses the previous steps and produces a reconstruction of the original signal within the limits of the allowed distortion. An entropy decoder stage 7 is followed by a dequantization stage 8 that will generate an approximation of the original transformed signal, denoted with $\hat{F}(u)$. Finally, the signal can be reconstructed by inverse transforming in stage 9:

$$\hat{f}(t)=T^{-1}(\hat{F}(u))$$

The resulting signal $\hat{f}(t)$ will be an approximation of the original signal f(t).

A practical example of the compression methodology of FIG. 1 can be found in the standard for image coding JPEG.

The preferred embodiment relies upon performing linear operations directly on transformed signals after they have been transformed 3. This could be especially advantageous for the approximated transformed signals. In fact, the presence of many zero coefficients will result in a correspondent reduction in the number of operations needed by allowing the use of sparse matrices techniques known in the art and for example described in Press W., Teukolsky S., Vetterling W., Flannery B., "Numerical Recipes in C", Cambridge University Press, 1994.

Suppose we have a group of signals compressed according to the method described in the previous section. Also suppose that we want to compute a linear combination of the reconstructed signals. If we indicate such signals as $\hat{f}_i(t)$ with $i \in \{0, N-1\}$, then the linear combination will be:

$$\hat{g}(t) = \sum_{i=0}^{N-1} c_i \hat{f}_i(t) \qquad (1)$$

Where $c_i$ are constant values.

Figure 2A:
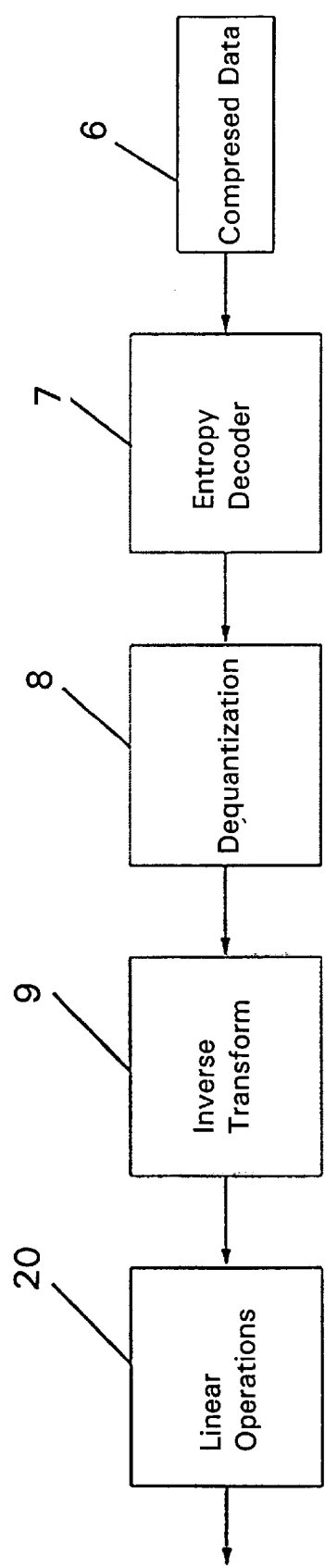
FIG. 2a illustrates a known form of applying a linear operation to geometric data.

The prior art way of computing such linear combination is to decompress each signal according to the method outlined in FIG. 1 and then perform the operations indicated in Eq. 1. This is shown in FIG. 2(a) after the previously described steps 7, 8, 9 the linear operation 20 is performed.

However, if we transform both terms of Eq. 1, we obtain:

$$T(\hat{g}(t)) = T\left(\sum_{i=0}^{N-1} c_i \hat{f}_i(t)\right) = \sum_{i=0}^{N-1} c_i T(\hat{f}_i(t)) = \sum_{i=0}^{N-1} c_i \hat{F}_i(u) \qquad (2)$$

due to the linearity of the transform T. $\hat{F}_i$ indicates the transformed counterpart of the signal $\hat{f}_i$.

Eq. 2 shows the equivalence of performing linear operations in the transformed domain. This can be very advantageous given that most of the values of transformed signals $\hat{F}_i$ are zero, making many multiplications and additions unnecessary. Thus, an alternative way of computing the linear combination expressed by Eq. 1, is to perform the required operations on transformed approximations $\hat{F}_i$ and to inverse transform the result:

$$\hat{g}(t) = T^{-1}\left(\sum_{i=0}^{N-1} c_i \hat{F}_i(u)\right) \qquad (3)$$

Figure 2B:
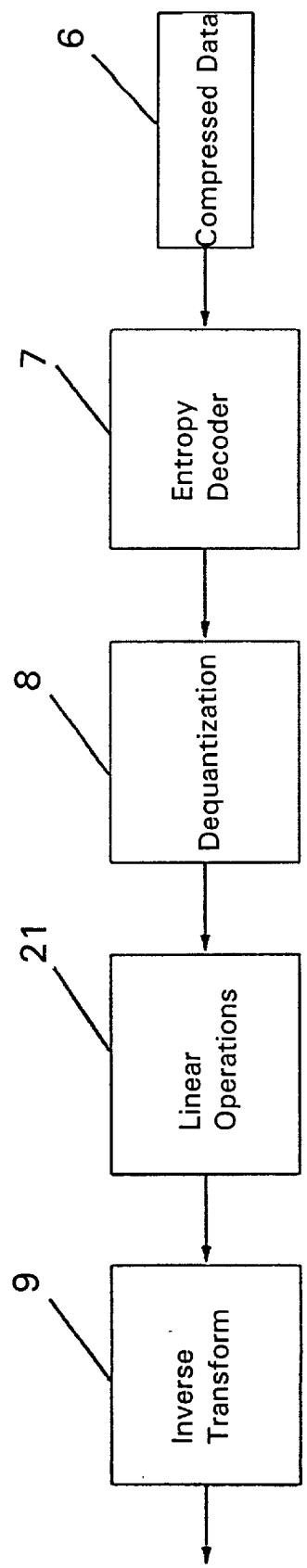
FIG. 2b illustrates the process of the preferred embodiment of applying a linear transform to geometric data.

This is shown in FIG. 2b after the steps 7 and 8 the linear operation 21 is performed, before the inverse transform stage 9. In cases where the dequantization process 8 is linear, the order of steps 8 and 21 can also be swapped.

These are powerful, general methods of performing linear operations directly on transformed signals (such as images, sounds or surface data). It is also important to stress that these methods depend only on the linearity of the transform and not on a particular transform. Examples of the utilization of this method will now be presented.

Surfaces in tridimensional space can be represented as three functions of two variables:

$$S=(x(u,v),y(u,v)z(u,v)) \; (u,v) \in D \subseteq R^2 \qquad (4)$$

where D is the set where the functions are defined. Each point on the surface S can be obtained by varying (u,v) in D. For instance, the surface of a sphere of radius $\rho$ can be described by.

$$\rho \cos u \cos v, \; \rho \sin u \cos v, \; \rho \sin v) \; (u, v) \in [0, 2\pi] \times \left[-\frac{\pi}{2}, \frac{\pi}{2}\right]$$

However, as already pointed out, such representation of a surface can be hard to render. Polygon meshes, on the other hand, can be quite simple to handle since they are composed of elementary objects (in general triangles) for which simple rendering algorithms exist. The drawback is a less compact representation of the same surface. Nevertheless, if we consider the lattice of points in tridimensional space belonging to a surface, they will exhibit some regularity. This regularity can ultimately be exploited to obtain a much more compact representation. The aforementioned points can, for example, constitute the vertices of a polygonal mesh.

Figure 3B:
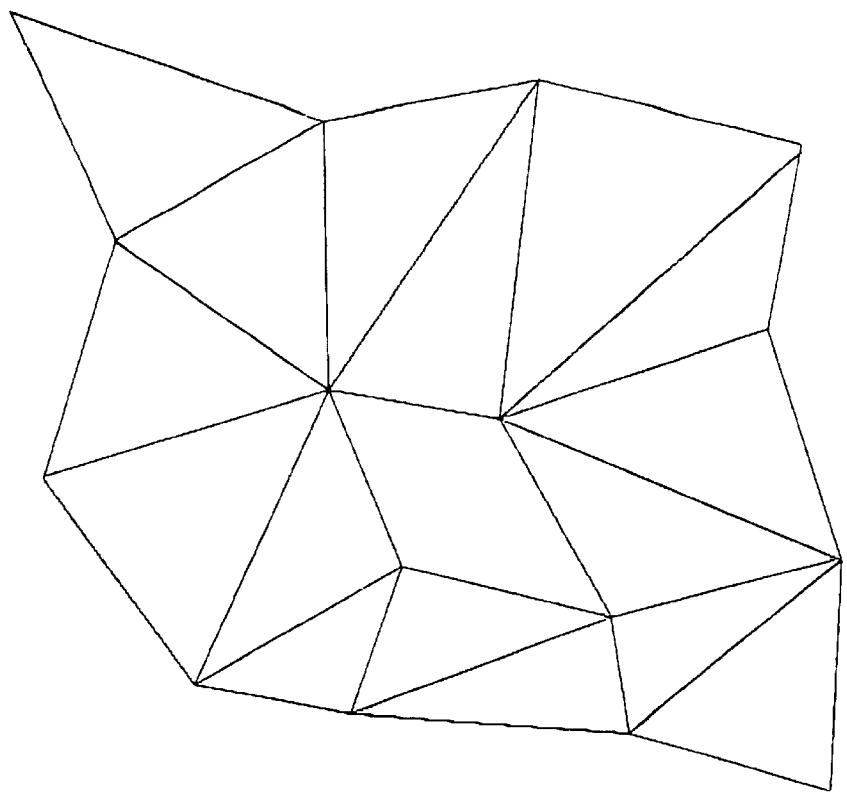
FIG. 3a and 3b illustrate geometric rectangular meshes.
Figure 3A:
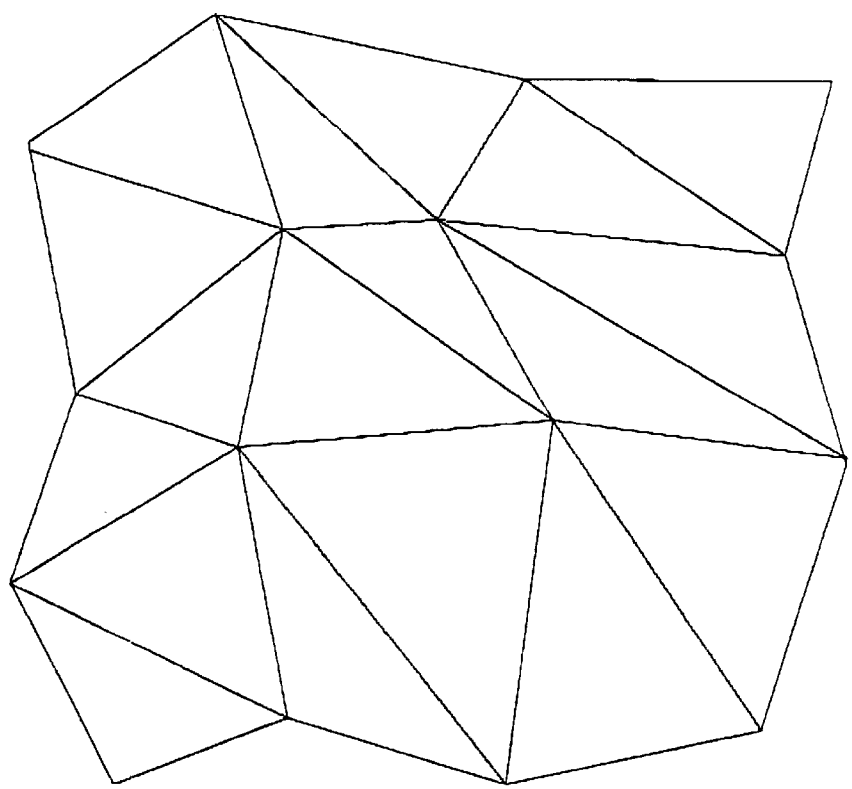

In order to conveniently exploit such regularity, the polygons' vertices can be arranged in a rectangular mesh as illustrated in FIG. 3a. Here a rectangular mesh of 4×4 vertices is illustrated. Each vertex is located by two indices i and j and indicated as $V_{ij}$. In FIG. 3a the connectivity amongst the vertices is very regular and can be implicitly defined by a simple, preassigned rule. Alternatively the connectivity amongst the vertices could be explicitly specified in the case of irregular meshes, such as the one illustrated in FIG. 3b.

Rectangular meshes can represent surface patches or, if the connectivity amongst the vertices allows wrap around the border of the rectangle, more complex geometries topologically equivalent to spheres and toruses. Such meshes can be produced by processing existing data or directly from scanners and CAD applications. For instance, it is known to decompose existing polygonal meshes into rectangular patches.

The coordinates $x_{ij}$, $y_{ij}$ and $Z_{ij}$ in tridimensional space of each vertex $v_{ij}$ can now be represented as three functions of two integer variables. Each of these functions can then be compressed with one of the many techniques that come in the framework previously described. Central to this framework is the transformation of the three functions:

$$X_{uv}=T(x_{ij}),\ Y_{uv}=T(Y_{ij}),\ Z_{uv}=T(z_{ij}) \quad (5)$$

where the transform T might depend on the application of choice. The usual steps of quantization and optional entropy encoding will follow.

Figure 4:
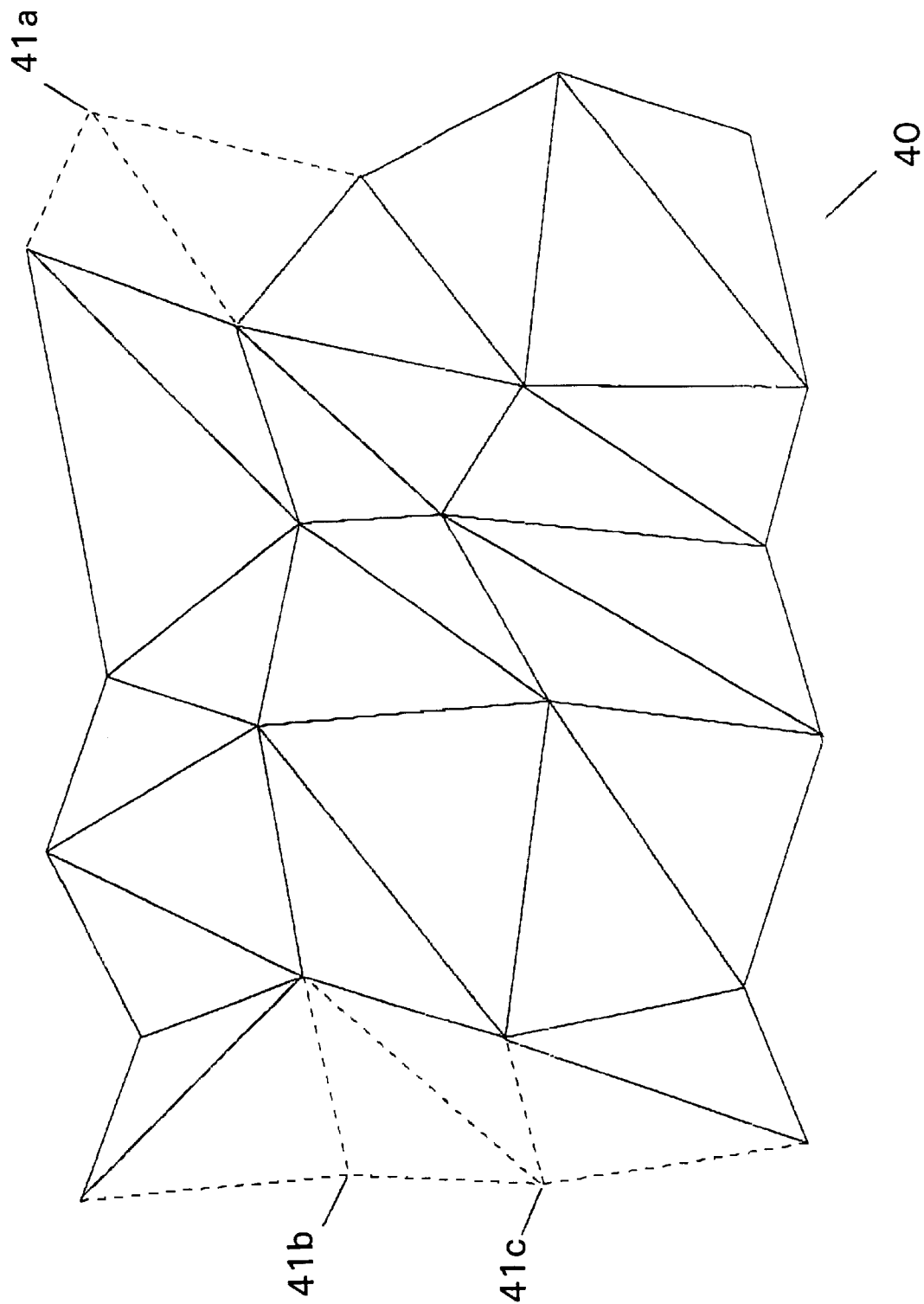
FIG. 4 illustrates the process of addition of dummy vertices to a mesh.

Although arranging the vertices in a rectangular mesh leads to particularly simple algorithms, transform techniques for surface compression are not restricted to such cases. In fact, it is possible to envisage transforms defined on non rectangular lattices that present similar properties. It is also possible to add "dummy" vertices to non rectangular meshes. These extra vertices are not part of the original mesh, but are added to obtain a more regular structure and are not used in the rendering process. The position of such vertices can be chosen to maximize the amount of compression. FIG. 4 illustrates the utilization of some "dummy" vertices (41) added to a non rectangular mesh (40) in order to make it rectangular. Alternatively, the surface data can be arranged in a vector instead of a rectangular array. This can be the case when the surface data is organized in triangles strips. In such case one vector per component, storing the coordinates of each triangle vertex, will be necessary, resulting in three vectors $x_i$, $y_i$ and $z_i$. These can then be compressed using the transform based techniques described. Algorithms for efficiently converting existing polygonal meshes into triangle strips are described in Evans F., Skien S., Varshney A., "Optimizing Triangle Strips for Fast Rendering", Department of Computer Science, State University of New York at Stony Brook.

Another possibility is to store all the coordinates of the points of the surface data in three vectors $x_i$, $y_i$ and $z_i$ to be compressed with transform techniques.

Figure 5:
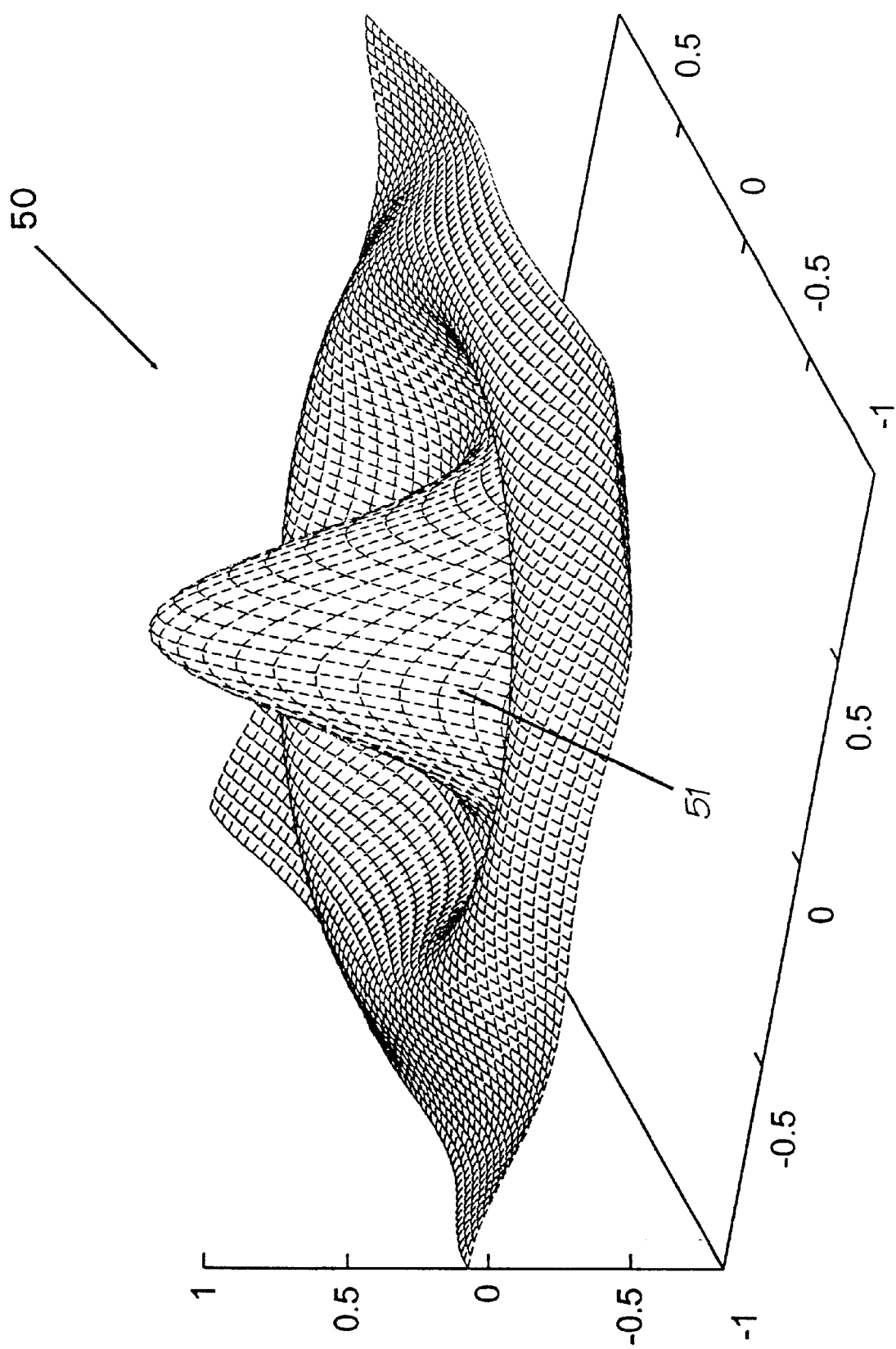
FIG. 5 illustrates a sample surface upon which transform operations are to be applied.
Figure 6:
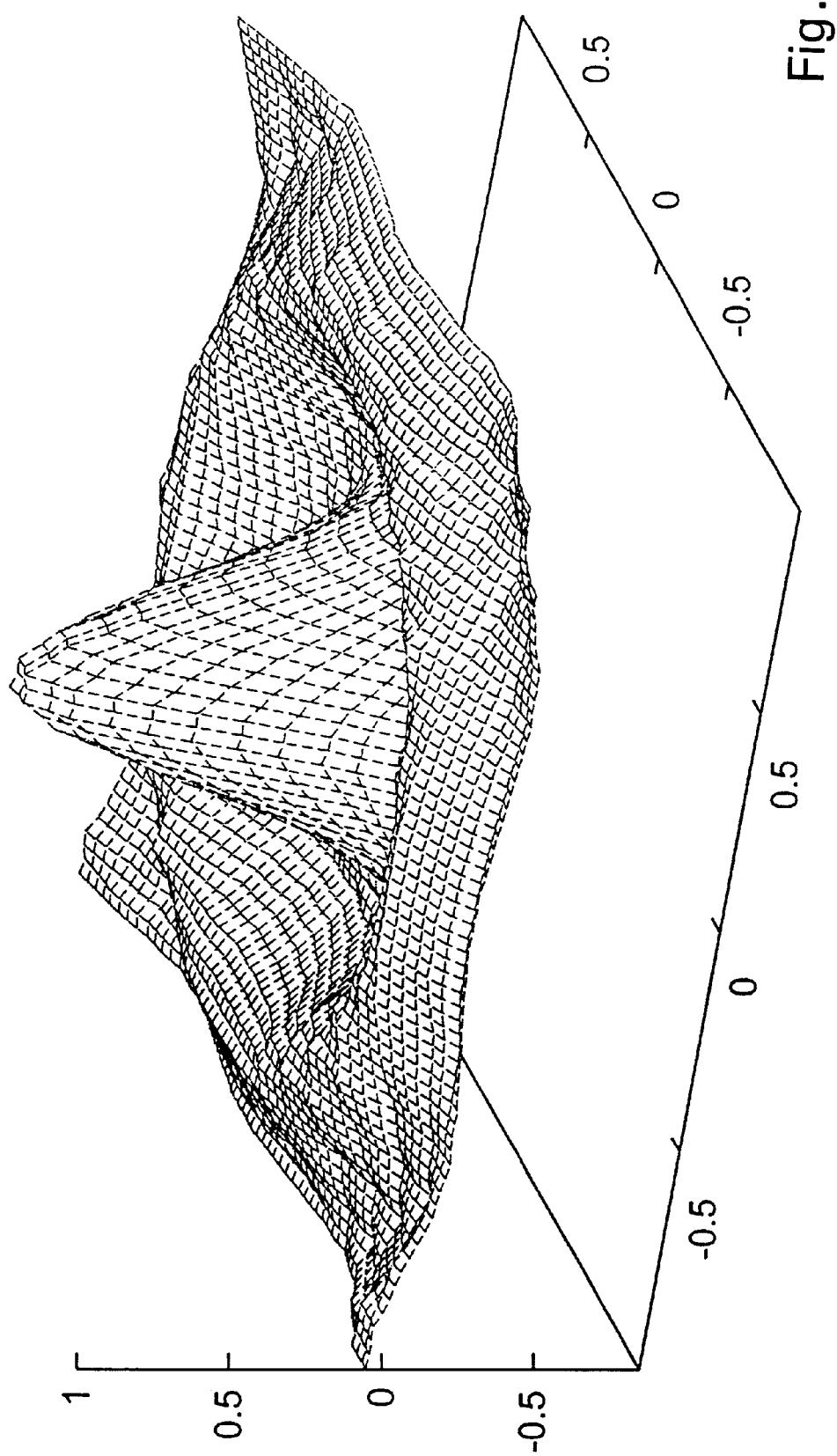
FIG. 6 illustrates the surface of FIG. 5 after wavelet quantization.

FIG. 5 shows an example of surface data 50 having a rectangular mesh having rectangles eg. 51. The rectangular mesh was obtained from the surface:

$$\left(u,\ v,\ \frac{\sin\left(\sqrt{u^2+v^2}\right)}{\sqrt{u^2+v^2}}\right) \quad (6)$$

by sampling each of its components at regular intervals along u and v between 0 and 1. This resulted in three arrays $x_{ij}$, $y_{ij}$ and $Z_{ij}$ each containing 64×64=4096 data points. Each of such components was then transformed using the wavelet known as Daubechies 4 with four levels of decomposition. All the coefficients whose magnitude was less then a threshold value were set to zero. This step can be seen as an alternative to the quantization step to generate an approximation of the transformed data set. In this case, more than 90% of the resulting coefficients was zero. The inverse wavelet transform was then applied to each component resulting in the approximated surface data shown in FIG. 6. FIG. 6 clearly shows the viability of the approach described for surface data compression.

As it can be readily noticed, the method described for surface compression is independent from the particular type of linear transform T chosen. However, for particular types of transforms, such as the ones collectively commonly known as Wavelet Transforms, a low resolution version of the original surface data can be easily obtained. Such lower resolution model is particularly useful when a surface is seen from a distance and its lack of detail is irrelevant. Also, the lower number of points constituting the low resolution version of the surface greatly simplifies its rendering.

Figure 7:
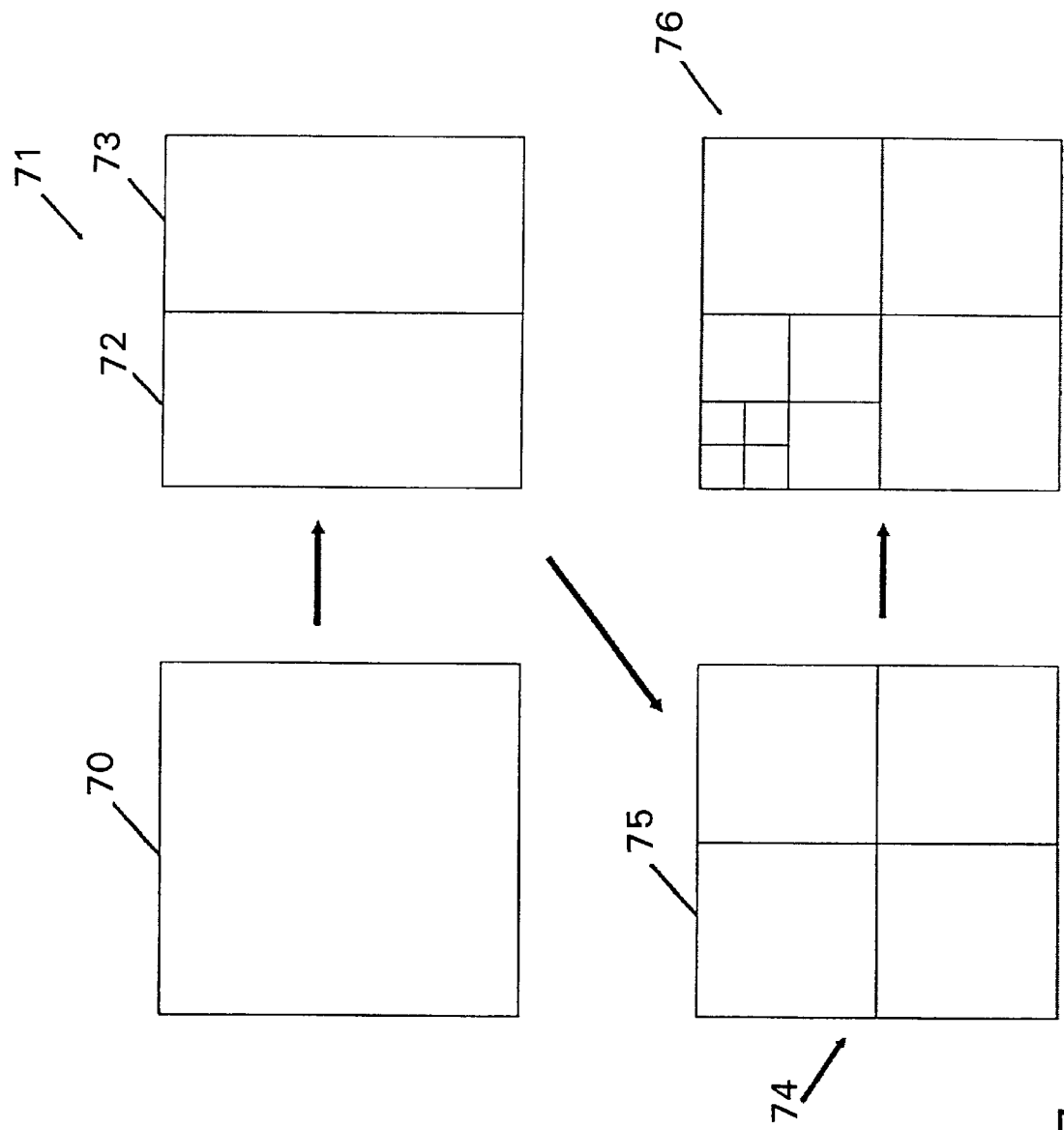
FIG. 7 illustrates the wavelet decomposition process.

FIG. 7 shows the standard process an example of wavelet decomposition of a two-dimensional signal. The signal or data 70 is filtered and subsampled horizontally first 71. The output signal 71 is formed by a low frequency part 72 and a high frequency part 73. The low and high pass filters used for this operation are well known and they have been described by numerous papers such as IEEE Signal Processing Magazine—October 1991.

A further filtering and subsampling step is performed vertically on both the low and high frequency parts 72 and 73, producing the signal 74. The portion 75 of the signal 74 contains a low resolution version of the original signal 70. The process described, also known as pyramid decomposition, can be recursively applied to the signal 75 producing, at each step, a new level of decomposition. Every time a new level of decomposition is generated, a lower resolution version of the original signal is produced. For instance, the signal 76 results after three steps. The process is reversible and signal 70 can be reconstructed from signal 76. In the case of surfaces in tridimensional space the decomposition and reconstruction processes can be applied to each of the components $x_{ij}$, $y_{ij}$ and $z_{ij}$ of the vertices $V_{ij}$ of the surface data.

During the decompression of the surface to be rendered, versions of increasing resolution and increasing number of vertices can be reconstructed. The reconstruction process can be stopped when the resolution of the surface is considered sufficient for the current purpose.

Surface attributes such as normals and colour information can also be compressed in a manner analogous to the one described. In fact, we can consider a normal vector ($N_{x_{ij}}$, $N_{y_{ij}}$, $N_{z_{ij}}$) and a color vector ($r_{x_{ij}}$, $g_{y_{ij}}$, $b_{z_{ij}}$) associated to each vertex $v_{ij}$ of the surface. Each component of such vectors can then be compressed with any the aforementioned transform techniques. Access to lower resolution versions of the data, as previously described, is also possible.

It will be readily apparent that the colour information associated to each surface point can belong to any colour space.

From the previous sections it is clear how to perform any linear operation on any surface data directly in the transformed domain. Operating directly in the transformed domain is particularly advantageous in the case of compressed signals where a large number of coefficients are zero.

The number of operations can be reduced further if only a lower resolution of a given surface is needed. In fact, all the linear operations need only to be performed on the portion of the transformed surface data representing the low resolution information. The portion of the data representing higher resolution information can in this case be discarded. In the wavelet domain this corresponds to perform the required linear operations on the lower levels of decompositions only. The amount of high resolution information that can be discarded will be application dependent.

Some applications on surface manipulation, all relevant to computer graphics, are outlined in the following sections.

The translation of an object is a very common and simple operation. This is achieved by adding a vector ($k_x$, $k_y$, $k_z$) to each point of the surface data:

$$(x_{ij}+k_x, y_{ij}+k_y, z_{ij}+k_z) \forall (i,j) \tag{7}$$

By linearly transforming each component of the vector in Eq. 7, we obtain:

$$T(x_{ij}+k_x)=T(x_{ij})+T(k_x) \tag{8}$$

$$T(y_{ij}+k_y)=T(y_{ij})+T(k_y) \tag{9}$$

$$T(z_{ij}+k_z)=T(z_{ij})+T(k_z) \tag{10}$$

Transforming a constant with a linear transform of the type useful for data compression will result mostly in zero values. For example, if the DCT transform was used, only one value will be non-zero. In the case the Wavelet Transform, only the coefficients of the lowest level of decomposition will be non-zero and constant. It follows that, if translation operation is performed in the transformed domain, a considerable reduction in the number of operations will be achieved since all the additions with zero coefficients are unnecessary.

Scaling of a surface is achieved by multiplying a different scalar $s_x$, $s_y$, $s_z$ each component:

$$(s_x x_{ij}, s_y y_{ij}, s_z z_{ij}) \forall (i,j) \tag{11}$$

Again, by linearly transforming each component of the vector in Eq. 11, we obtain:

$$T(s_x x_{ij})=s_x T(x_{ij}) \tag{12}$$

$$T(s_y Y_{ij})=s_y T(y_{ij}) \tag{13}$$

$$T(S_z z_{ij})=s_z T(z_{ij}) \tag{14}$$

If the surface to be scaled had been previously compressed, then, performing the scaling operation directly in the transformed domain, will result in a smaller number of operations. This is because most of the coefficients of the compressed components $x_{ij}$, $y_{ij}$, and $z_{ij}$, will then be zero and no multiplication will be necessary for them.

Affine transforms are particularly useful in the manipulation of surfaces. Fundamental operations such as rotations can be implemented via an affine transformation of the surface data. An affine transform on each vertex $V_{ij}$ is defined as:

$$[x'_{ij}, y'_{ij}, z'_{ij}] = \begin{bmatrix} a_{11} & a_{12} & a_{13} \\ a_{21} & a_{22} & a_{23} \\ a_{31} & a_{32} & a_{33} \end{bmatrix} \begin{bmatrix} x_{ij} \\ y_{ij} \\ z_{ij} \end{bmatrix} + \begin{bmatrix} b_1 \\ b_2 \\ b_3 \end{bmatrix} \forall (i,j) \tag{15}$$

By linearly transforming each component of Eq. 15 we obtain:

$$[T(x'_{ij}), T(y'_{ij}), , T(z'_{ij})] = \begin{bmatrix} a_{11} & a_{12} & a_{13} \\ a_{21} & a_{22} & a_{23} \\ a_{31} & a_{32} & a_{33} \end{bmatrix} \begin{bmatrix} T(x_{ij}) \\ T(y_{ij}) \\ T(z_{ij}) \end{bmatrix} + \begin{bmatrix} T(b_1) \\ T(b_2) \\ T(b_3) \end{bmatrix} \tag{16}$$

Eq. 16 shows that an affine transform on surface data (points or normals) can be equivalently performed in the transformed domain. This, as already pointed out, can be exploited to reduce the number of required operations.

Figure 8:
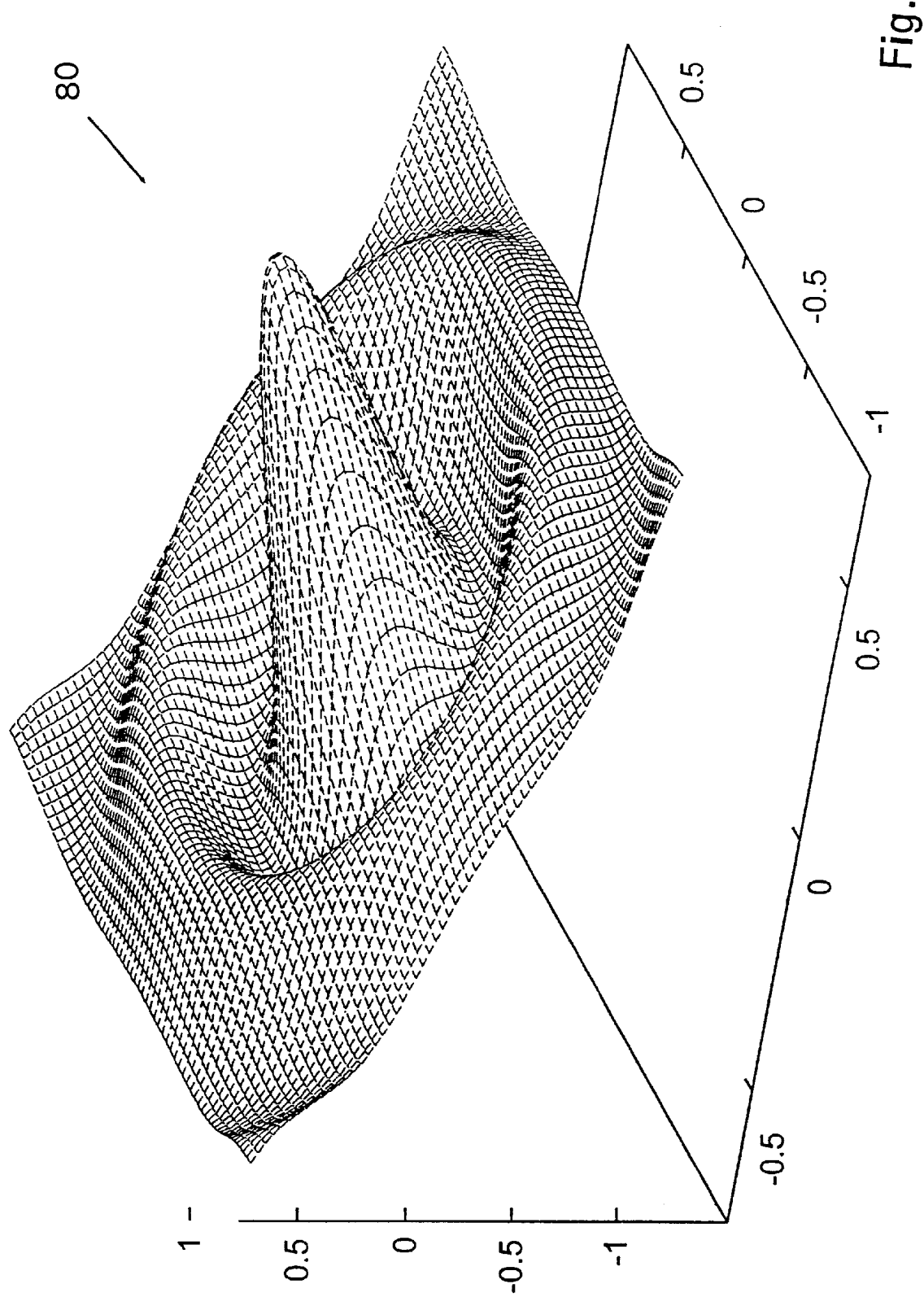
FIG. 8 illustrates the process of applying an affine transformation to the surface of FIG. 5.
Figure 9:
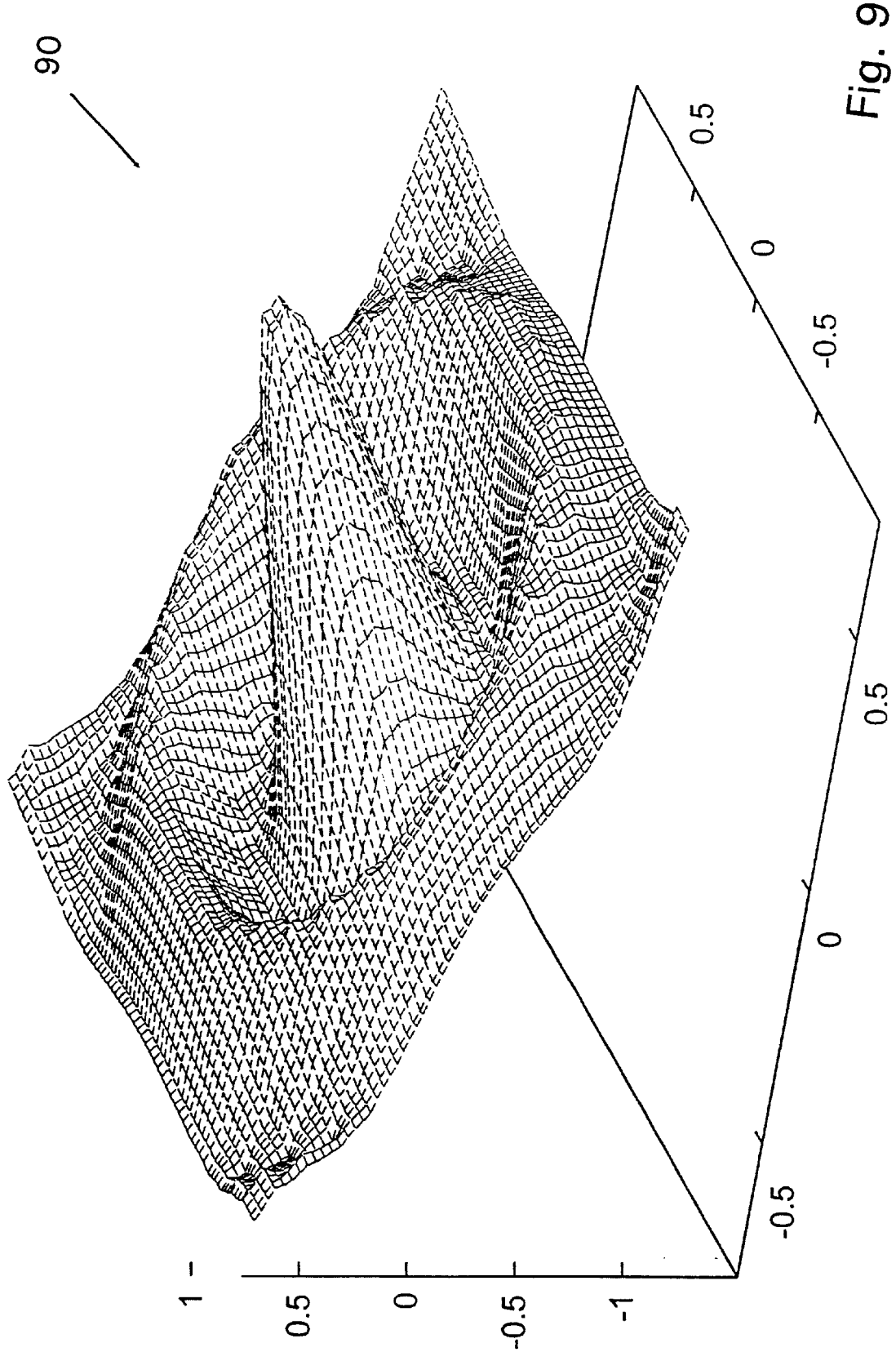
FIG. 9 illustrates the process of applying an affine transformation before inverse transformation in accordance with the principles of the preferred embodiment.

FIG. 8 shows the same surface data shown in FIG. 5 rotated 80 using an affine transform. The surface data 90 shown in FIG. 9 was obtained by applying the same affine transform directly in the Wavelet transformed domain. The same approximated surface data shown in FIG. 6 was utilized before the affine transform and the inverse Wavelet transform were applied. FIG. 9 clearly shows the viability of performing linear operations directly in the transformed domain.

Morphing can be utilized to smoothly change an object into another. For instance, if we have two surfaces S and S' represented by two polygon meshes whose vertices' coordinates are ($x_{ij}, y_{ij}, z_{ij}$) and ($x'_{ij}, y'_{ij}, z'_{ij}$) respectively, then a third object can be defined as:

$$(x''_{ij}, y''_{ij}, z''_{ij}) = (1-t)(x_{ij}, y_{ij}, z_{ij}) + t(x'_{ij}, y'_{ij}, z'_{ij}) \forall (i,j) \tag{17}$$

By varying the scalar t between 0 and 1, the resulting surface will change smoothly from S to S'.

By linearly transforming each component of Eq. 17 it is easy to show that the morphing operation can be performed in the transformed domain:

$$T(x''_{ij})=(1-t)T(x_{ij})+tT(x'_{ij}) \tag{18}$$

$$T(y''_{ij})=(1-t)T(y_{ij})+tT(yx_{ij}) \tag{19}$$

$$T(z''_{ij})=(1-t)T(z_{ij})+tT(z'_{ij}) \tag{20}$$

Other interpolation formulas, different from the one given in Eq. 17, possibly involving more than two surfaces, can also be utilized.

The dot product between two vectors is a fairly common operation in computer graphics while performing operations such as backface culling or illumination model calculations. Given the vectors ($N_{x_{ij}}, N_{y_{ij}}, N_{z_{ij}}$) representing, for instance, the normals to a surface and a constant vector ($L_x, L_y, L_z$) the dot product $d_{ij}$ for each vector is:

$$d_{ij}=(L_x, L_y, L_z) \cdot (N_{x_{ij}}, N_{y_{ij}}, N_{z_{ij}}) = L_x N_{x_{ij}} + L_y N_{y_{ij}} + L_z N_{z_{ij}} \tag{21}$$

By linearly transforming both sides of Eq.21, we obtain:

$$T(d_{ij})=T((L_x,L_y,L_z) \cdot (N_{x_{ij}},N_{y_{ij}},N_{z_{ij}}))= \tag{22}$$

$$L_x T(N_{x_{ij}}) + L_y T(N_{y_{ij}}) + L_z T(N_{z_{ij}}) \tag{23}$$

That again shows the possibility of performing dot products in the transformed domain.

In case of dot product between non constant vectors:

$$d_{ij}=(L_{x_{ij}},L_{y_{ij}},L_{z_{ij}}) \cdot (N_{x_{ij}},N_{y_{ij}},N_{z_{ij}})= \tag{24}$$

$$L_{x_{ij}} N_{x_{ij}} + L_{y_{ij}} N_{y_{ij}} + L_{z_{ij}} N_{z_{ij}} \tag{25}$$

By linearly transforming both sides of Eq. 25, we obtain:

$$T(d_{ij})=T((L_x,L_y,L_z) \cdot (N_{x_{ij}},N_{y_{ij}},N_{z_{ij}}))=\tag{26}$$

$$T(L_{x_{ij}} N_{x_{ij}}) + T(L_{y_{ij}} N_{y_{ij}}) + T(L_{z_{ij}} N_{z_{ij}}) \tag{27}$$

Operating in the transformed domain might still be possible, but will depend on the type of transform T. For instance, in the case of the Fourier transform, the transform of the product of two functions f(t) and g(t) is equal to the convolution product of the transformed functions:

$$T(f(t)g(t))=T(f(t))*T(g(t)) \quad (28)$$

Given that, in the transformed domain, as often pointed out, most of coefficients will be zero, this particular operation can still be quite convenient. Similar result can be obtained for transforms other than Fourier.

EXAMPLE IMPLEMENTATION

A simple implementation was constructed utilizing a standard computer system.

The S+P transform, slightly modified in order to make it linear, was utilized. The S+P transform is discussed in Said A and Perlman W., "Reversible image compression via multiresolution representation and predictive coding," Proc. SPIE vol. 2094: Visual Commun. and Image Processing pp. 664–674, Nov. 1993 and is a very simple transform that uses only additions and shift operations and allows a multiresolution representation of the data.

The modifications necessary in order to make the S+P transform linear are very simple and consist in the elimination of all the non linear operations such as truncation. The linearization of the S+P transform is necessary in order to perform linear operations directly in the transformed domain.

Accordingly, given a sequence $c_n$, n=0, . . . , N−1, with N even, this can be represented by two sequences:

$$l_n = c_{2n} + c_{2n+1} \quad n=0, \ldots, N/2-1 \quad (29)$$

$$h_n = c_{2n} - c_{2n+1} \quad n=0, \ldots, N/2-1 \quad (30)$$

Where the sequences $l_n$ and $h_n$ represent a linear version of the S transform. The prediction stage of the S+P transform is similarly linearized.

$$hd_n = h_n - \hat{h}_n \quad n=0, \ldots, N/2-1 \quad (31)$$

With $\hat{h}_n$ defined as:

$$\hat{h}_n = \frac{1}{8}(2(\Delta l_n + \Delta l_{n+1} - h_{n+1}) + \Delta l_{n+1}) \quad (32)$$

$$\Delta l_n = l_{n-1} - l_n \quad (33)$$

At the boundary, $\hat{h}_n$ is defined as:

$$\hat{h}_0 = \Delta l_1/4 \hat{h}_{N/2-1} = \Delta l_{N/2-2}/4 \quad (34)$$

The two sequences $l_n$ and $hd_n$ are the final result of the linearized S+P transform.

This transform was used to build a multiresolution pyramid of each component of tridimensional geometry data as previously discussed.

In order to test direct operations in the transformed domain a slightly more complex scheme that the one used to produce the output 90 of FIG. 9. As before, the tridimensional data was transformed and then quantized, but, instead of simply performing an affine transform on transformed and quantized data, the operations were computed directly on the sparse data representation.

Figure 10:
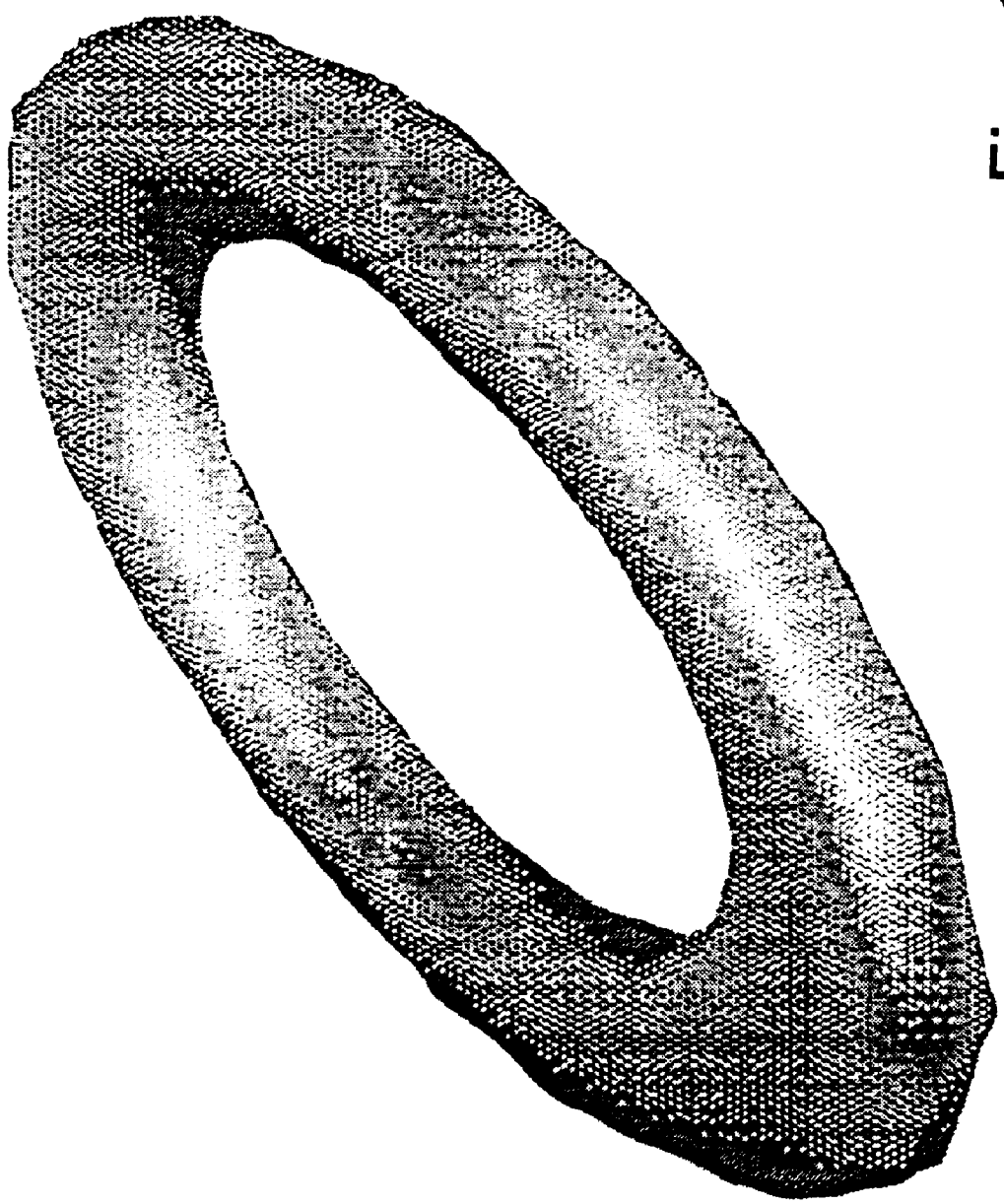
FIG. 10 illustrates example torus data utilized in an experiment conducted in accordance with the principles of the preferred embodiments

An experiment was performed on data representing a torus, as shown in FIG. 10. Each component was transformed with the linearized S+P transform with four levels of decomposition and then quantized. The resulting data, as expected, was quite sparse.

A specialised run length encoding scheme was utilized where the x, y, z components were encoded together. Since most of operations on tridimensional data are performed on all the components at the same time, it is important that they can be accessed together during processing.

Also, since it is desirable that data be accessed at different levels of detail, it makes sense to group the data according to the regions resulting from the pyramid decomposition. Four levels of multiresolution pyramid decomposition will result in 13 regions, three more than the case shown in FIG. 7.

For each x, y, z component of the tridimensional data, corresponding regions from the decomposition are encoded together. Within each region, triplets of corresponding coefficients are encoded according to the scheme illustrated in FIG. 11.

Basically, the zero count field ZLENGTH 111 counts the triplets of all zero coefficients (null triplets) while the three bit code CODE 112 section indicates which coefficients are non zero in the first non zero triplet. This is followed by the values of the non zero coefficients 113. Further reduction in the data size can be achieved by applying an entropy encoding scheme.

This scheme is very simple and allows common operations such as affine transforms to be performed easily directly in the compressed format. In fact, the null triplets can be skipped thanks to the run length encoding scheme, avoiding unnecessary operations. Such operations need only to be performed on non null triplets. The following pseudo code shows an affine transform (such as the one shown in Eq. 16) performed on the specialized run length code while it gets expanded:

```
// Performs the Affine Transform Matrix Product For Each
(region in the transformed domain) Begin
    For Each(run length code) Begin Clear a Number of
Coefficients Equal to ZLENGTH Case(CODE)
        0: Error // Invailid CODE
        1: (x,y,z)=A*(Xd,0,0) // x coefficient non zero
        2: (x,y,z)=A*(0,Yd,0) // Y coefficient non zero
        3: (x,y,z)=A*(Xd,Yd,0) // X,Y coefficients non zero
        4: (x,y,z)=A*(0,0,Zd) // Z coefficient non zero
        5: (x,y,z)=A*(Xd,0,Zd) // X,Z coefficients non zero
        6: (x,y,z)=A*(Xd,Yd,0) / X,Y coefficients non zero
        7: (x,y,z)=A*(Xd,Yd,Zd) // X,Y,Z coefficients non zero
    end
end
// Performs the Constant Addition
    Add the Transformed B Vector to the Lowest Resolution
Region
```

The matrix A and the vector B define the affine transform. Since it is known from the CODE field which coefficients are zero, the matrix multiplication can be simplified even further. The constant B vector, once transformed with the modified S+P transform, is all zero, except for the lowest level of decomposition.

Figure 12:
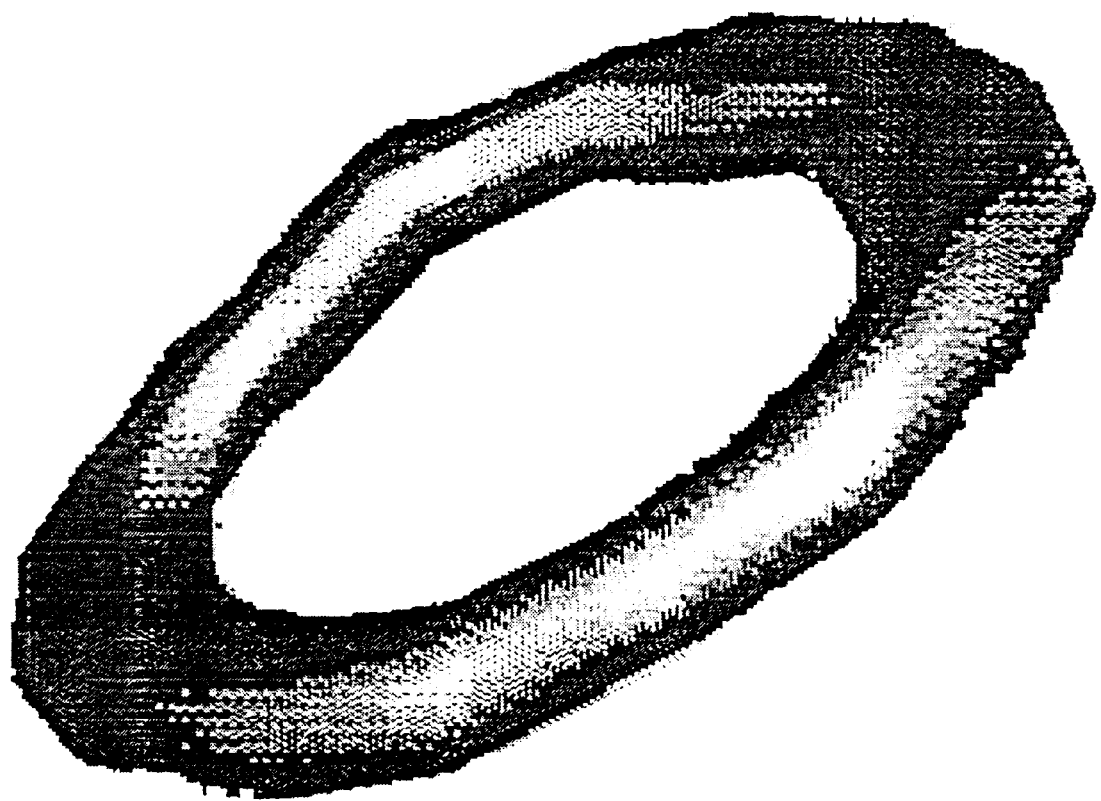
FIG. 12 illustrates the torus data of FIG. 10 after rotation in the transform domain.

FIG. 12 shows the results of having torus data directly rotated in the compressed domain by operating directly in the specialized run length structure described. About 89% of the coefficient in the transformed domain were zero.

Although the techniques described for compression and manipulation of geometries were aimed at surfaces and tridimensional models, they can be readily and easily extended to other data such as curves in 2D or higher dimensions. These can be used in a variety of applications from animations to map manipulation and visualization. Curves in tridimensional space can be used, for instance, to compactly describe the trajectory of an object in space.

Another interesting possibility is to use the described techniques to compress and manipulate geometries evolving in time. In fact, points belonging to a surface changing in time can be described by the vector:

$$(x_{ijt}, y_{ijt}, z_{ijt}) \qquad (35)$$

By varying the value of the parameter t, the set of points in tridimensional space described by the vector will change. Such points can be interpreted as a sequence of vertices of a polygonal mesh changing in time. The vector in Eq. 35 can then be compressed within the framework previously described by linearly transforming each of its components:

$$X_{uvw} = T(x_{ijt}) Y_{uvw} = T(y_{ijt}) Z_{uvw} = T(z_{ijt}) \qquad (36)$$

This will be followed by the other steps shown in FIG. 1. The transform T will be, in this case, a tridimensional transform.

This methodology can be used to compress a predefined model evolving in time such as, for example, a tridimensional character for a video game or an animation.

Linear operations directly in the transformed domain will be possible, as previously described. However, any linear operation performed directly in the transformed domain will apply globally to all the points and for every value of the parameter t. This can be inconvenient if we wanted to perform a different linear operation on each element of the sequence. For example, this situation might arise if we wanted to change the point of view of the observer while the object itself is changing. In this case we would want to apply a different affine transform, corresponding to each new point of view, to each of the elements of the sequence. A possible solution is to decompress the whole sequence and then perform a different linear operation on each of its elements.

Figure 13:
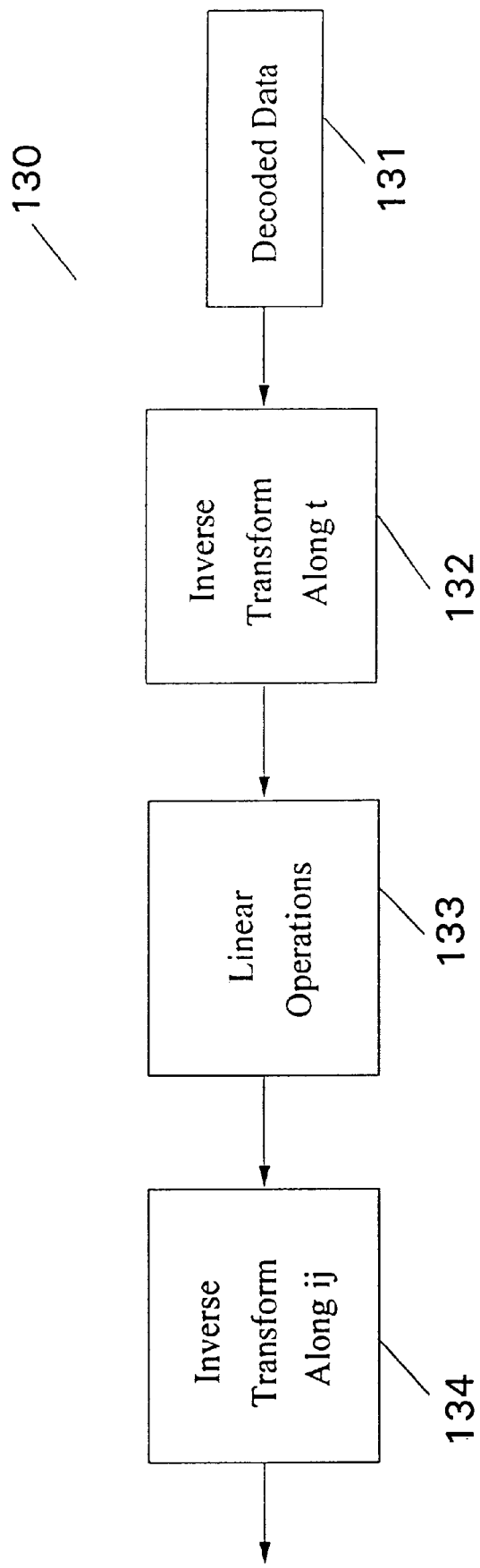
FIG. 13 illustrates a process of applying a transform to compressed geometries evolving over time.

A better solution is possible if the tridimensional transform T can be decomposed into a bidimensional transform Tij and a transform $T_t$:

$$T(\ ) = T_{ij}(T_t(\ )) \qquad (37)$$

Where $T_{ij}$ transform along the indices i and j and t. It is then possible to follow the steps 130 indicated in FIG. 13. Here the decoded data 131 obtained from dequantization and entropy decoding stages, is inverse transformed along t in step 132. This results in a sequence of surface data, each independent from t. This surface data is still quite sparse, allowing linear operations to be conveniently performed on it in step 133. The process is then completed by inverse transform each element of the sequence along i and j in step 134.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method of spatial manipulation of geometry data by applying a linear transform to one or more sets of geometry data describing a graphical object to produce manipulated geometry data, said method comprising the steps of:
   (a) compressing said geometry data of into a compressed form, said compressing including the step of transforming said data into corresponding frequency domain component data including DC-components, zero and non-zero coefficients;
   (b) performing multiplication and additions as part of said linear transform on the non-zero coefficients of said corresponding frequency domain component data;
   (c) performing an addition with a constant as part of said linear transform by adding said constant only to the DC component of said frequency domain component data;
   (d) decompressing said geometry data, including applying an inverse transform to said frequency domain component data, to transform said geometry data to provide said manipulated geometry data.

2. A method of spatial manipulation of geometry data describing a graphical object as claimed in claim 1 wherein said linear transforms include one of:
   translation of said geometry data;
   scaling of said geometry data;
   affine transformation of said geometry data;
   morphing of said geometry data; or
   applying a dot product to said geometry data.

3. A method of spatial manipulation of geometry data describing a graphical object as claimed in claim 2 wherein said step (a) further comprises:
   quantizing said frequency component domain data.

4. A method of spatial manipulation of geometry data describing a graphical object as claimed in claim 3 wherein said step (a) further comprises:
   zeroing said frequency component domain data less then a predetermined magnitude.

5. A method of spatial manipulation of geometry data describing a graphical object as claimed in claim 1 wherein said transforming said data into corresponding frequency component domain comprises utilizing a Discrete Cosine, Fourier, Hardamard or Wavelet transform.

6. A method of spatial manipulation of geometry data describing a graphical object as claimed in claim 1 wherein said geometry data includes a series of vertex points and color data associated with each of said vertex points.

7. A method of spatial manipulation of geometry data describing a graphical object as claimed in claim 2 wherein said geometry data includes a series of vertex points and normal vector data associated with each of said vertex points.

8. A method of spatial manipulation of geometry data describing a graphical object as claimed in claim 1 wherein the dimensionality of said geometry data is two.

9. A method of spatial manipulation of geometry data describing a graphical object as claimed in claim 1 wherein the dimensionality of said geometry data is greater then 3.

10. A method of manipulation of geometric data comprising a series of vertex points defining a geometric structure, said method comprising the steps of:
   transforming said data into a frequency domain to produce corresponding frequency domain data including DC-components, zero and non-zero coefficients;
   applying a linear transform to said frequency domain data to produce linearly transformed frequency domain data, said linear transform including performing multiplication and additions as part of said linear transform on the non-zero coefficients of said corresponding frequency domain component data and performing an addition with a constant as part of said linear transform by adding said constant only to the DC component of said frequency domain component data;
   inverse transforming said linearly transformed frequency domain data to produce manipulated geometric data.

11. An apparatus for spatial manipulation of geometry data describing a graphical object to produce manipulated geometry data, said apparatus comprising:

compression means for compressing said geometry data of into a compressed form, said compressing including transforming said data into corresponding frequency domain component data including DC-components, zero and non-zero coefficients;

linear transform application means for applying at least one linear transform to said compressed form of said geometry data, said linear transform including performing multiplications and additions as part of said linear transform on the non-zero coefficients of said corresponding frequency domain component data and performing an addition with a constant only to the DC-component of said; and decompression means for decompressing said geometry data, including applying an inverse transform to said frequency domain component data, to transform said geometry data to output said manipulated geometry data.

12. An apparatus as claimed in claim 11 wherein said compression means, said linear transform application means and said decompression means are implemented in software on a computer system.

* * * * *